United States Patent [19]
Wall et al.

[11] 3,911,084
[45] Oct. 7, 1975

[54] PROCESS FOR SEPARATING SULFUR OXIDES FROM GAS STREAMS

[75] Inventors: Bruce Irving Wall, Escalon, Calif.; Henry Clinton Harris, Green River, Wyo.; Jose Luis Arnaud, Citrus Heights, Calif.

[73] Assignee: FMC Corporation, New York, N.Y.

[22] Filed: Feb. 20, 1973

[21] Appl. No.: 333,993

Related U.S. Application Data
[63] Continuation-in-part of Ser. No. 259,061, June 2, 1972, abandoned.

[52] U.S. Cl. .................................................. 423/242
[51] Int. Cl.² ......................................... C01B 17/00
[58] Field of Search ..................... 423/242–243, 423/244

[56] References Cited
UNITED STATES PATENTS
1,271,899  7/1918  Howard et al. ................. 423/242
3,653,812  4/1972  Schneider et al. .............. 423/242
3,775,532  11/1973  Shah .............................. 423/242

Primary Examiner—Oscar R. Vertiz
Assistant Examiner—Gregory A. Heller
Attorney, Agent, or Firm—Dressler, Goldsmith, Clement & Gordon, Ltd.

[57] ABSTRACT

Sulfur oxides, particularly sulfur dioxide, present in waste gas streams are separated therefrom by contacting the sulfur oxides with a sodium sulfite-sodium bisulfite extraction liquor having a pH of at least 6, regenerating a portion of the sulfur oxides-containing extraction liquor by adding calcium hydroxide thereto to raise the pH of the liquor to about 8 to 10, removing a calcium sulfite precipitate from the regenerated extraction liquor, and mixing the solids-free regenerated extraction liquor with the sulfur oxides-containing extraction liquor to maintain its pH of at least 6.

13 Claims, 2 Drawing Figures

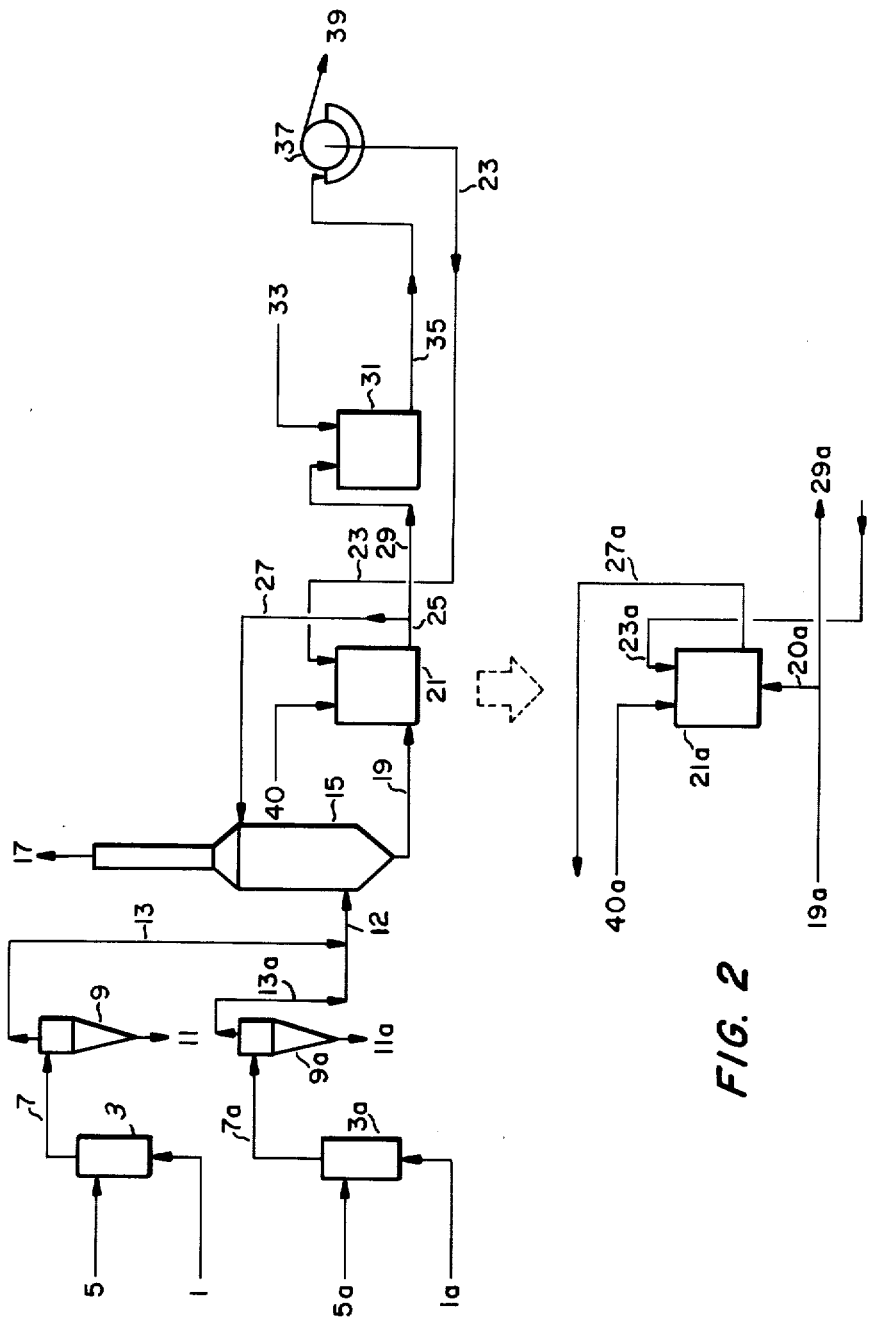

PROCESS FOR SEPARATING SULFUR OXIDES FROM GAS STREAMS

This application is a continuation-in-part of application Ser. No. 259,061 filed June 2, 1972 and now abandoned.

This invention relates to a process for removing sulfur oxides, particularly sulfur dioxide, from gas streams by contacting the gas streams with a liquor containing dissolved sodium sulfite and sodium bisulfite and to the regeneration of the liquor with the removal of the retained sulfur oxide values as calcium sulfite.

The removal of sulfur oxides, particularly sulfur dioxide, from waste gas streams has for ecological reasons become most necessary. In general, these waste gas streams are generated by burning sulfur-containing fuels, although they can also be generated from various waste gas producing processes such as those encountered in sulfur acid plants and metallurgical processes in which sulfur-containing gases are swept along with the heating gases which are sent to the waste stacks.

The removal of sulfur oxides, and particularly sulfur dioxide, from these waste gas streams has been attempted by a number of processes. The most widespread suggested technique for removing sulfur oxides is by direct precipitation of the sulfur oxides in a calcium-containing liquor. Such a liquor can readily be made up using calcium carbonate or some forms of limestone which are inexpensive and quite readily available. The limestone solution reacts with the sulfur dioxide gases and forms an insoluble calcium salt such as calcium sulfate (or sulfite) which precipitates from the scrubbing liquor.

The difficulty with this technique is that insolubles unavoidably form within the scrubbing mechanism and in short order clog the scrubbing mechanism, equipment and lines through which the scrubbing solution flows. This then requires periodic removal of the insolubles which build up within the interior walls and surfaces of the reactor or scrubbing unit. In some instances, if the buildup is too great, the reactor must be replaced.

In order to overcome these difficulties, other processes have been developed in which the sulfur oxides are absorbed in a liquor in soluble form. The liquor is then treated in a second stage to precipitate the sulfur compound as an insoluble salt. One such process is set forth in U.S. Pat. No. 3,607,033 issued on Sept. 21, 1971 in the name of Indravadan S. Shah, wherein a portion of the absorbing liquor is treated with limestone to precipitate the sulfur compound and form a sodium carbonate solution. This solution, in turn, is used to regenerate the remaining absorbing liquor. Another process described in the article "Sulfur Dioxide Emission Control by Wet Scrubbing" by Robert J. Phillips (Nov. 4, 1970), reported in the Fifth Annual Conference on Air Pollution, Division of Continuing Education, Oakland University, Rochester, Michigan, utilizes a caustic soda solution as the scrubbing liquor, and regenerates with lime.

These and other similar systems remove the obvious difficulty of carrying out precipitation of the sulfur compound in an initial scrubbing unit. However, while the systems represent an improvement in the art, they still suffer serious difficulties in operation. One such difficulty is in obtaining a rapid and substantially quantitative reaction of the added regenerating calcium salt, such as limestone, with the absorbing or scrubbing liquor. While higher efficiencies can be obtained by lowering the pH of the scrubbing liquor, this decreases the capacity of the scrubbing liquor to absorb sulfur oxide gases.

Another, more serious problem is that of calcium carry-over from the regenerating system. If any appreciable calcium values, either in soluble form or as insoluble dispersions of calcium salts, are carried to the scrubbing unit, it will result in precipitates forming within the scrubbing unit which eventually cause clogging. The calcium carry-over problem is considered most serious because it leads to the formation of the same insoluble precipitates within the scrubbing unit as are obtained with a calcium carbonate scrubbing liquor and, likewise, results in encrustations forming on the interior walls and surfaces within the scrubbing unit. Eventually, such encrustations cause failure of the unit and pluggage of the lines therefrom.

In one process, as reported in the article "Sulfur Dioxide Emission Control For Industrial Power Plants", Robert J. Phillips (Nov. 1971) G.M. Manufacturing Development, G.M. Technical Center, Warren, Michigan, it has been suggested that a settling unit be located immediately after the scrubbing unit in order to allow settling of the scrubbing liquor and removal of the precipitate formed by calcium carry-over. Such a procedure would not be entirely satisfactory because it involves slowing up the flow of scrubbing liquor, increasing the volumes of extracting liquor required and adding capital expenditures for the large settling areas that would be required for such treatment.

In accordance with the present invention, it has been found that gaseous sulfur oxides, such as sulfur dioxide, can be removed from waste gas streams by contacting the gas stream with a circulating scrubbing liquor that absorbs the sulfur oxides without formation of insolubles therein, continuously regenerating a portion of the recirculating scrubbing liquor in a regenerating stage to remove insoluble sulfur compounds and recycling the regenerated scrubbing liquor.

This is carried out according to the present invention by passing the gas stream containing the sulfur oxide into a gas-liquid contactor and contacting the stream with an extracting solution having a pH of at least 6 and containing both sodium sulfite and sodium bisulfite, absorbing the sulfur oxides therein, separating the resulting extract from the sulfur oxide-depleted gas stream, passing extract into a mixing chamber and blending it with sufficient amounts of a recycled, substantially solid-free, regenerated, extracting solution having an alkaline pH of between about 8 and 10, so that the blended solution has a pH of at least about 6 (preferably 6–7), removing a portion of extracting solution containing absorbed sulfur oxides and conveying it to a regenerating zone, adding a calcium compound to the regenerating zone in amounts sufficient to regenerate sodium sulfate and to form a slurry of calcium sulfite in which the slurry has a pH of about 8 to about 10 (preferably about 8 to 9), precipitating and separating calcium sulfite from the slurry, separating the resultant, substantially solids-free, regenerated extracting solution and recycling it to the mixing chamber for blending with the extract solution from the gas-liquid container and, finally, recycling extracting solution from the mixing chamber to the gas-liquid contactor.

The attached drawing illustrates a descriptive flow sheet of the present invention.

FIG. 1 of the drawing illustrates the processing steps and the chemical treatment which takes place at the various steps.

FIG. 2 illustrates a second, alternate embodiment.

The invention can best be illustrated by reference to FIG. 1 of the attached drawing. The sulfur oxide-containing waste gas enters the system through conduit 1. The waste gas stream normally contains sulfur oxides in the form of sulfur dioxide, but other sulfur oxides, such as sulfur trioxide, also may be present and removed by this process. If more than one waste gas stream is to be treated in this process, each of the waste gas streams can be pretreated in similar, parallel-type equipment as illustrated in the drawing. In this case separate waste gas streams would enter the system at 1A and at 1.

The gas stream then enters a heat exchange device 3 and 3A where the temperature of the gases is reduced to less than 500°F. If the gas is below this temperature, this cooling step can be dispensed with. One convenient way of cooling the gas stream is by spraying water into heat exchangers 3 and 3A through inlet lines 5 and 5A. The heat exchange in 3 and 3A can be effected by direct heat exchange or indirect heat exchange with the coolant. The cooled gas stream is removed through line 7 and 7A and then enters a cyclonic separator 9 and 9A for the removal of any fine particles such as ash or the like which are carried forth in the gas stream. The purpose of using a cyclonic separator 9 and 9A is to remove the bulk of the particulate matter present in the gas stream. Some fine solids can be sent forward into the system without affecting its operation. However, if the amount of solid, particulate matter entering the system is too great, there is always the possibility of plugging the gas-liquid contactor downstream in the system. The particulate matter is then removed from the cyclone at points 11 and 11A while the gas streams, which have now been cooled and the bulk of their particulate matter removed, are then passed through lines 13 and 13A into a gas-liquid contactor 15.

The gas-liquid contactor 15 can be any equipment which effects complete and thorough mixing of a gas stream with a liquid scrubbing medium. This would include equipment such as venturi scrubbing units or packed columns, where the packing may be conventional packing materials such as Berl saddles, Raschig rings and the like. Alternately, the gas-liquid contactor can contain plates such as sieve plates or bubble caps to effect contact between the gas and liquid. The design and structure of gas-liquid contactors are well known in the art and do not constitute a part of the instant invention.

The sulfur oxide-containing gas from lines 13 and 13A is contacted with a liquid extracting solution that enters the contactor 15 through line 27. As shown in the contactor 15 the gas and liquid pass countercurrent to each other; that is, the liquid flows downwardly and the gas flows upwardly. While this is the preferred and easiest mode of operation, it is possible that the liquid and gas can be passed cocurrent or cross flow through the gas-liquid contactor 15.

The extracting solution, which is passed through line 27 into contactor 15, is an aqueous solution of sodium sulfite and sodium bisulfite having a pH of at least about 6. The preferred pH of the extracting solution is from about 6 to about 7 and is maintained by adjusting the relative ratio of sodium sulfite to sodium bisulfite dissolved in the extracting solution. While the above extracting solution contains sodium sulfite and sodium bisulfite as necessary ingredients, it frequently also contains sodium sulfate. The sodium sulfate is present in the extracting solution if the waste gases contain sulfur trioxide or if sufficient oxygen is present in the gases or system to oxidize sulfur dioxide to sulfur trioxide or to oxidize sodium sulfite or bisulfite to sodium sulfate.

In the make-up of the extracting solution it is generally desirable to have excess amounts of sodium sulfite, beyond the stoichiometric quantities necessary to react with the sulfur oxides, in order to act as a buffer to maintain the pH at about 6 or above when the extracting solution contacts sulfur dioxide gas. Otherwise, the $SO_2$ will substantially lower the pH below 6 and decrease the rate of $SO_2$ absorption in the extracting solution.

In the gas-liquid contactor 15 the extracting solution and the sulfur oxides react and the sulfur oxides are absorbed in the extracting solution and removed from the gas stream. The mechanism for removing the $SO_2$ (the principal contaminant) is believed to take place in accordance with one of the following mechanisms:

$$Na_2SO_3 + SO_2 + H_2O \rightarrow 2NaHSO_3$$

The reaction between sulfur dioxide and water may first form hydrogen sulfite and this may in turn react with the sodium sulfite solution as follows:

$$SO_2 + H_2O \rightarrow H_2SO_3$$

$$H_2SO_3 + Na_2SO_3 \rightarrow 2NaHSO_3$$

In all events, the sulfur dioxide is converted in the extracting solution to sodium bisulfite ($MaHSO_3$). In addition to the above, if any free oxygen is present in the gas stream, it can react with sodium sulfite to form sodium sulfate in accordance with the reaction set forth below.

$$Na_2SO_3 + \tfrac{1}{2} O_2 \rightarrow Na_2SO_4$$

The liquid extracting solution which passes into gas-liquid contactor 15 through line 27 must have a minimum pH of about 6. At pH's below this level the $SO_2$ extracting efficiency of the extracting solution decreases markedly and is undesirable. While this extracting solution can be used at any pH above 6, insofar as scrubbing efficiencies are concerned, preferably the solution is not allowed to reach pH's materially above 7. The reason for this is that the chemical efficiency of the regenerating step, which is carried out subsequently, has been found to be highest when the pH of the extracting solution is no higher than about 7.

A typical extracting solution would have a pH of between 6.2 to 6.7 and contain from about 3 to about 14% sodium sulfite ($Na_2SO_3$) and 3 to 9% of sodium bisulfite ($NaHSO_3$). If sodium sulfate is present, this may be present in any amount up to its solubility limits. It is advantageous to have the cumulative amount of dissolved salts, namely, the sulfite, bisulfite and sulfates of sodium, reach at least 20 weight percent in the extracting solution. A high total concentration of salts tends to inhibit oxidation and the undesired conversion of sulfite to sulfate values. If desired, other additives such as glucose or mannitol may be used to further inhibit oxidation of the sulfite values.

After the extracting solution passes through the gas-liquid contactor 15 it is removed through line 19. The separated, sulfur oxide-depleted gas stream is vented from the gas-liquid contactor 15 as stream 17. The pH of the extracting solution will have decreased as a result of absorbing sulfur oxides and its bisulfite content will have increased somewhat. In a typical extraction the pH of the extracting solution in line 19 will decrease to a range of from about 5.9 to 6.3. The extracting solution containing the absorbed sulfur oxide is then passed into a mixing chamber 21.

Into this mixing chamber is added a substantially solids-free, regenerated, extracting solution through line 23; the regenerated extracting solution is derived from a downstream regenerating operation which is described subsequently. In the mixing chamber 21 the extracting solution, containing absorbed sulfur oxide, and the regenerated extracting solution are blended together to yield a solution having a pH of at least about 6 (preferably a pH of 6 to 7). Since the pH of the extracting solution entering through line 19 is substantially below 7 and the pH of the regenerated, extracting solution entering through line 23 is alkaline, the proper blending of these reagents yields a solution having a pH of at least 6 and preferably between 6 and 7.

In FIG. 1 of the drawing, the resulting solution in mixing chamber 21 is withdrawn through line 25 and separated into two streams. The main stream, line 27, is then recycled to the gas-liquid contactor 15 as described above, while a second, smaller stream is removed through line 29 to regenerating zone 31. It is important that up to this stage of the process all of the ingredients remain dissolved in the extracting solution, except for such fine, particulate matter which may have been brought in with the waste gas stream. No solids should be formed as a result of absorbing sulfur oxides in the extracting solution in these stages of the instant invention, because such solids would be detrimental to the proper functioning of the system.

The solution from line 29 is passed into a regenerating zone 31 and is reacted with a calcium compound, such as calcium hydroxide or calcium oxide, which is added through line 33 into the regenerating zone 31. The amount of the calcium salt added should be sufficient to raise the pH of the solution in the regenerating zone 31 to an alkaline pH of about 8 to about 10. The preferred pH is between about 8 and 9, with the optimum pH being about 8 to 8.5. Under the above conditions the added calcium compound, such as calcium hydroxide, reacts essentially quantitatively with the extracting solution and most rapidly. The pH of the solution in the regenerating zone should not be increased to beyond about 10 because at substantially higher pH's calcium compounds, in either soluble or dispersion form, can be present in the slurry formed in the regenerating zone. Such compounds; and undesirably would be recycled to the contactor 15 with the extracting solution.

The calcium compound reacts with the sodium bisulfite in regenerating zone 31 to form insoluble calcium sulfite and, further, to regenerate the sodium bisulfite to sodium sulfite.

The reaction which take place is as follows:

$$2NaHSO_3 + Ca(OH)_2 \rightarrow CaSO_3 \downarrow + Na_2SO_3 + 2H_2O$$

The slurry which is formed in the regenerating zone 31 is then removed through line 35 and passed into a filter 37. The solids 39, comprising mainly calcium sulfite are separated in filter 37 from the mother liquor which is removed through line 23. The mother liquor in line 23, which has a pH of from 8 to 10 and preferably between about 8 and 9, is then returned to the mixing chamber 21 for blending with the extracting solution containing absorbed sulfur oxides.

During the above regenerating step, sodium bisulfite is converted to sodium sulfite and returned back to the extracting system to absorb additional sulfur oxides.

In sufficient calcium hydroxide or oxide is added to the regenerating zone 31 to react with all of the sodium bisulfite, any additional calcium hydroxide or oxide added will react with the sodium sulfite to form sodium hydroxide and insoluble calcium sulfite. This reaction takes place as follows:

$$Na_2SO_3 + Ca(OH)_2 \rightarrow 2NaOH + CaSO_3 \downarrow$$

Sodium hydroxide thus formed and which is present in the regenerated extraction solution will react with sodium bisulfite in mixing chamber 21 to form additional sodium sulfite in accordance with the following.

$$NaOH + NaHSO_3 \rightarrow Na_2SO_3 + H_2O$$

The total effect of the regenerating step, other than forming insoluble calcium sulfite, is to convert sodium values back to sodium sulfite (and possibly some sodium hydroxide), for return of these values to mixing chamber 21, and the make-up of a suitable extracting solution having a pH from about 6 to about 7. However, some sodium values are nevertheless lost. In the course of carrying out the filtration step in filter 37, some mother liquor is unavoidably removed with the solids 39. As a result of this, sodium values e.g. $Na_2SO_4$, $Na_2SO_3$ or $NaHSO_3$ are lost as drag-out with the solids which are removed from the system. To make up the loss a soluble sodium slat is added into the system, preferably in mixing chamber 21 through line 40, in amounts sufficient to replace the sodium which is lost due to drag-out. The sodium salt which can be utilized can be sodium carbonate, sodium sesquicarbonate or sodium hydroxide or naturally occuring sodium salts such as trona or nahcolite. These salts, e.g. $Na_2CO_3$, when added to the system react to form sodium sulfite.

One convenient way of monitoring the amount of sodium salt added to a typical extracting solution of the instant invention is to add enough sodium salt to maintain the specific gravity of the extracting solution within desired limits e.g. a specific gravity of from 1.10 to 1.20 at an equivalent solution temperature of 150° to 170°F.

An alternate embodiment for carrying out the process is shown in FIG. 2 of the drawing. In this embodiment the extracting liquor, after passing through the gas-liquid contactor 15 is passed through line 19A. The major portion of the liquor in line 19A continues through line 20A into a mixing chamber 21A. A portion of the liquor in line 19A is removed through line 29A and passed to the regenerating zone 31. The regenerated, solids-free liquor is then returned through line 23A to the mixing chamber 21A. A portion of the blended liquor in mixing chamber 21A is recirculated to the gas-liquid contactor 15 through line 27A. A soluble sodium salt is added through line 40A as make-up to the mixing chamber 21A.

In this alternate embodiment, the only solution which is sent to the regeneration zone is the extract which is directly removed as underflow from the gas-liquid contactor without being blended with any regenerated solution. This arrangement sends only mixed extracting solution from the mixing chamber to the gas-liquid contactor for extraction; no mixed extracting solution is passed directly to the regenerating zone.

The concentration of sodium sulfate in the extraction liquor generally is allowed to increase until an equilibrium is reached. The sodium sulfate concentration is controlled by regulating the amount of mother liquor (containing $Na_2SO_4$) that is dragged out with the calcium sulfite precipitate and balancing this against the sodium sulfate that is formed in solution during the operation of the process. The concentration of sodium sulfate should never be allowed to exceed its saturation level in the extracting solution.

Once the sodium sulfate concentration equilibrates, it generally remains at some fixed level, depending upon the specific operation of the process. In general, operation with high concentrations of sodium sulfate in the extraction liquor is desired because less of the valuable sodium sulfite and sodium bisulfite are removed as drag-out with the calcium sulfite precipitate during the filtration step. Instead, the drag-out liquor contains higher concentrations of sodium sulfate and lower concentrations of sodium sulfite and sodium bisulfite. In some cases if the rate of removal of sodium sulfate exceeds the rate of formation of the sodium sulfate in solution, the drag-out liquor (containing $Na_2SO_4$) may be separated from the precipitate, washed, and recycled to the extracting liquor in order to maintain the sodium sulfate values.

The final requirement in the regenerating stage is to maintain the regenerating solution (slurry) at a pH of from about 8 to about 10, and preferably at a pH of from about 8 to 9. It has been found that by preventing the solution in the regenerating zone from rising to pH's substantially higher than about 10, the rate of reaction of the lime is sufficiently high that no undissolved lime is carried over into the regenerated liquor. Thus when the regenerated liquor is returned to the mixing tank to make up additional extracting solution, essentially no calcium values are carried forward that can precipitate in the extracting solution when it contacts the sulfur oxide-containing gases.

Similarly the pH of the solution in the regenerating zone should not be materially below 8 for efficient operation. At a pH below 8, the regenerating solution still contains unreacted sodium bisulfite values. Highest efficiencies are obtained when the sodium bisulfite values are all converted to calcium sulfite. Operating at the preferred pH's of about 8 to 9 and the optimum pH's of 8 to 8.5 in the regenerating zone permits conversion of essentially all of the sodium bisulfite values to calcium sulfite, without any calcium carry over, and with quantitative reaction of the added calcium hydroxide. Under these conditions the mother liquor, which is obtained from filter 37 and which is returned via line 23 to the mixing chamber 21, is essentially free of any sodium bisulfite.

The following operating examples are provided to illustrate the invention. All proportions used herein are by weight unless otherwise specified.

EXAMPLE 1

A waste kiln gas obtained from the roasting of barite ore with coke was treated by the process illustrated in FIG. 1 of the drawing. The waste gas entered a single heat exchanger where it was cooled from about 1,500°F to about 495°F by spraying with water. Subsequently, coarse particles of entrained particulates were separated in a dust removal stage. Thereafter, the gas was introduced into a gas-liquid contactor, such as illustrated in FIG. 1 of the drawing, which was filled with packing to assure proper gas-liquid contact. The gas entered the gas-liquid contactor 15 at 495°F through line 12 and was passed upwardly through contactor 15 at a rate of 14,000 cubic feet per minute at 495°F (ACFM). The gas introduced 400 pounds per hour of sulfur dioxide and 44 pounds per hour of fine kiln dust into the contactor 15. An extracting solution circulating through line 27 was passed into the top of gas-liquid contactor 15 and passed downwardly in countercurrent contact with the rising gas stream. The extracting solution had a pH of 6.4 and a specific gravity of 1.18 and contained the following ingredients:

| | |
|---|---|
| $Na_2SO_3$ | 8.1% |
| $Na_2SO_4$ | 8.1% |
| $NaHSO_3$ | 7.9% |
| Solids | 0.8% |
| $H_2O$ | Balance |

A side stream of this extracting solution in a ratio of 1 to 20 compared with the main stream in line 27, was passed through line 29 into a regenerating zone 31. Into the regenerating tank 31 was added 412 pounds per hour of calcium hydroxide, $Ca(OH)_2$. A precipitate formed in the regenerating zone and the resulting slurry was removed through line 35 to a filter. The slurry has a pH of 8.3 and its composition was as follows:

| | |
|---|---|
| $Na_2SO_3$ | 11.5% |
| $Na_2SO_4$ | 8.7% |
| $NaOH$ | 0.6% |
| Solids | 2.4% |
| $H_2O$ | Balance |

A moist filter cake was removed from the filter and contained the following:

FILTER CAKE

| Dry Solids — 40.39% | | Mother Liquor — 59.61% | |
|---|---|---|---|
| | Wt. % of Insolubles | | Wt. % of Solution |
| $SO_3^=$ (reported as $CaSO_3$) | 82.1 | $Na_2SO_3$ | 11.8 |
| $SO_4^=$ (reported as $CaSO_4$)[a] | 5.8 | $Na_2SO_4$ | 8.9 |
| Kiln Dust | 12.1 | $NaOH$ | 0.7 |
| | | $H_2O$ | 78.6 |

[a] fresh sample (sealed against oxidation) contained less than 0.5% by weight $CaSO_4$ The mother liquor filtrate separated from the precipitate, containing sodium hydroxide, sodium sulfate and sodium sulfite salts, was returned to the mixing chamber 21 through line 23. The pH of this solution was 8.3. To make up for sodium which is dragged out with the filter cake, 152 pounds per hour of soda ash, $Na_2CO_3$, was added into the mixing chamber 21 through line 40.

The overhead gases stream 17 from gas-liquid contactor 15 contained 3.8 pounds per hour of $SO_2$, thereby removing over 99% of the $SO_2$ content of the gas stream.

EXAMPLE 2

A portion of flue gas stream from a coal fired steam boiler having a temperature of 480°F was passed through a gas purifier made up of a gas-liquid contactor, in the form of a venturi wet scrubber, a cyclonic entrainment separator and finally an induced draft fan to exhaust the gas from the system. The flue gas feed contained 1,400 ppm (by volume) of $SO_2$ and 0.5% of fly ash. It flowed into the gas-liquid contactor at a rate of 1786 ACFM (at 165°F). An extracting solution was flowed into the gas-liquid contactor at a rate of 29.95 gallons/minute. The extracting solution had a specific gravity of 1.24, a pH of 6.18 at 65°C, an ionic strength of 6.33 moles/liter, and had the following composition; $Na_2SO_3$ 0.57 moles/liter (5.8 wt. %); $NaHSO_3$ 0.64 moles/liter (5.4 wt. %); $Na_2SO_4$ 1.33 moles/liter (15.2 wt. %) i.e. having a sulfate-to-sulfite plus bisulfite ratio greater than about 1.

The gas exited from the fan at a temperature of about 165°F and had an $SO_2$ concentration of 180 ppm. The extracting solution, which was separated from the gas stream in the cyclonic entrainment separator, was pumped to a recirculating tank. A side stream from the gas-liquid contactor (5 gallons/minute) was passed to a settling tank and the overflow was returned to the recirculating tank. The underflow from the settling tank was then taken to an agitated regenerating tank where calcium hydroxide was added at a rate of 0.2 pounds/minute. A slurry of fly ash and calcium sulfite was fed from the regenerating tank to a rotary drum filter. The solids were removed on the filter and the filtrate was returned to the recirculating tank. The slurry in the regenerating tank had the following composition:

Suspended solids = 8% by volume;
$Na_2SO_3$ after filtration = 0.89 moles/liter (9.0 wt. %);
$NaHSO_3$ after filtration = 0.008 moles/liter (0.07 wt. %);
$Na_2SO_4$ after filtration = 1.35 moles/liter (15.4 wt. %).

The solids removed from the filter had the following composition:

Entrained liquid = 44 wt. %
$CaSO_3$ = 35 wt. %
Fly ash = 19 wt. %
Unidentified solids = 2 wt. %

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. Process for removing gaseous sulfur oxides from a gas stream containing said sulfur oxides which comprises the steps of
    providing a circulating aqueous extracting solution containing sodium sulfite and sodium bisulfite, and having a pH of about 6 to about 7;
    contacting said gas stream in a gas-liquid contactor with said circulating extracting solution to form a liquid extract having a relatively higher sodium bisulfite content and a relatively lower pH;
    recovering said extract;
    regenerating at least a portion of the sodium bisulfite content of said extract to sodium sulfite by treatment in a single regeneration step with a calcium compound selected from the group consisting of calcium oxide and calcium hydroxide in an amount sufficient to form an aqueous slurry containing dissolved sodium sulfite and solid calcium sulfite and having a pH of about 8 to about 10;
    separating the solid calcium sulfite from said slurry so as to form a regenerated aqueous solution having a reduced sodium bisulfite concentration; and
    comingling said regenerated aqueous solution with said circulating extracting solution so as to maintain the circulating extracting solution at pH of about 6 to about 7.

2. Process of claim 1 wherein said slurry has a pH of from about 8 to about 9.

3. Process of claim 1 wherein said slurry has a pH of from about 8 to about 8.5.

4. Process of claim 1 wherein said extracting solution has a pH of from about 6.2 to 6.7.

5. Process of claim 1 wherein said extract has a pH of about 5.9 to about 6.3.

6. process of claim 1 wherein the recovered extract is first blended with said regenerated aqueous solution and a portion of the blend is thereafter reacted with said calcium compound to regenerate the sodium bisulfite content while the remainder of the blend is recycled to the gas-liquid contactor as said circulating extracting solution.

7. Process of claim 1 wherein a sodium salt selected from the group consisting of sodium carbonate, sodium hydroxide, trona, nahcolite and sodium sesquicarbonate is added to said blended aqueous solution to make up sodium values removed with said calcium sulfite.

8. Process of claim 1 wherein said calcium compound is calcium hydroxide.

9. Process of claim 6 wherein said sodium salt is sodium carbonate.

10. Process of claim 6 wherein said sodium salt is sodium hydroxide.

11. Process of claim 1 wherein the recovered extract blended with said regenerated aqueous solution and a portion of the blend is thereafter reacted with said calcium compound to regenerate the sodium bisulfite content while the remainder of the blend is recycled to the gas-liquid contactor as said circulating extracting solution.

12. Process of claim 1 wherein a portion of the recovered extract is removed directly to a regenerating zone and reacted with said calcium compound.

13. Process of claim 1 wherein the circulating extracting solution contains at least 20 weight percent total of dissolved sodium salts including sodium sulfate, and wherein the amount of sodium sulfate in the circulating extracting solution relative to sodium sulfate and sodium bisulfite is in a sulfate-to-sulfite plus bisulfite molar ratio greater than about 1 but less than the sodium sulfate saturation level in the extracting solution.

* * * * *

UNITED STATES PATENT OFFICE
CERTIFICATE OF CORRECTION

PATENT NO. : 3,911,084
DATED : October 7, 1975
INVENTOR(S) : Bruce Irving Wall, Henry Clinton Harris and Jose Luis Arnaud It is certified that error appears in the above-identified patent and that said Letters Patent are hereby corrected as shown below:

```
Column 2,   line 59,  "sulfate" should be -- sulfite --.
Column 5,   line 44,  "salt" should be -- compound --;
            line 56,  delete "; and";
            line 64,  "take" should be -- takes --.
Column 6,   line 11,  "In" should be -- If --;
            line 37,  "slat" should be -- salt --.
Column 10,  line 28,  "process" should be -- Process --;
            line 35,  "claim 1" should be -- claim 6 --;
            line 42,  "claim 6" should be -- claim 7 --;
            line 44,  "claim 6" should be -- claim 7 --;
            lines 46-52,
```

"11. Process of claim 1 wherein the recovered extract blended with said regenerated aqueous solution and a portion of the blend is thereafter reacted with said calcium compound to regenerate the sodium bisulfite content while the remainder of the blend is recycled to the gas-liquid contactor as said circulating extracting solution."

should be

-- 11. Process of claim 7 wherein said sodium salt is trona. --;

Column 10, line 60, "sulfate" should be -- sulfite --.

Signed and Sealed this second Day of March 1976

[SEAL]

Attest:

RUTH C. MASON
Attesting Officer

C. MARSHALL DANN
Commissioner of Patents and Trademarks